(12) United States Patent
Navratil et al.

(10) Patent No.: US 11,474,338 B2
(45) Date of Patent: Oct. 18, 2022

(54) BINOCULAR FOCUSING MECHANISM WITH ADJUSTABLE STIFFNESS OF OPERATION

(71) Applicant: Meopta—optika, s.r.o., Prerov (CZ)

(72) Inventors: Karel Navratil, Chropyne (CZ); Milos Slany, Prerov (CZ)

(73) Assignee: MEOPTA—OPTIKA, S.R.O.

( * ) Notice: Subject to any disclaimer, the term of this patent is extended or adjusted under 35 U.S.C. 154(b) by 298 days.

(21) Appl. No.: 16/539,572

(22) Filed: Aug. 13, 2019

(65) Prior Publication Data

US 2020/0057295 A1 Feb. 20, 2020

(30) Foreign Application Priority Data

Aug. 14, 2018 (CZ) ................................. CZ2018-415

(51) Int. Cl.
*G02B 23/18* (2006.01)
(52) U.S. Cl.
CPC .................................... *G02B 23/18* (2013.01)
(58) Field of Classification Search
CPC ....................................................... G02B 23/18
See application file for complete search history.

(56) References Cited

U.S. PATENT DOCUMENTS 3,402,692 A * 9/1968 Hickman ............... G06M 1/064
116/295
3,540,792 A * 11/1970 Akin, Jr. .................. G02B 7/06
359/414
3,916,721 A * 11/1975 Egger ....................... G05G 1/10
74/553

(Continued)

FOREIGN PATENT DOCUMENTS

CA 883387 A 10/1971
CN 201177688 Y 1/2009
(Continued)

OTHER PUBLICATIONS

Search Report dated May 13, 2019 in corresponding Czech Republic Patent Application No. CZ PV 2018-415.
(Continued)

*Primary Examiner* — Christopher Stanford
(74) *Attorney, Agent, or Firm* — Ostrolenk Faber LLP

(57) ABSTRACT

A focusing mechanism for a binocular with dual stiffness of operation, comprises a focusing knob which is mounted rotatably about its longitudinal axis on a static shaft which is fixedly mounted in the binocular structure. The focusing knob is associated with a braking means with adjustable braking effect and is provided with a braking drum. The cylindrical circumferential surface of the braking drum is associated rotatably about its longitudinal axis with the cylindrical circumferential surface of a braking ring, whose other cylindrical circumferential surface is associated by its circumferential surface with a collet of a clamping ring, which is with its rigid part seated in the housing which is fixedly mounted on the static shaft. The collet of the clamping ring is associated with the control of the pressure force on the cylindrical circumferential surface of the braking ring, the control of the gripping of the collet being coupled to a switch of stiffness of the focusing operation.

9 Claims, 7 Drawing Sheets

(56) References Cited

U.S. PATENT DOCUMENTS

| | | | | |
|---|---|---|---|---|
| 4,818,086 A * | 4/1989 | Moore | ............... | G02B 7/06 359/414 |
| 5,103,248 A * | 4/1992 | Sato | ............... | G02B 7/06 359/414 |
| 5,206,758 A * | 4/1993 | Kim | ............... | G02B 7/12 359/414 |
| 5,212,591 A | 5/1993 | Funathu | ............... | 359/407 |
| 5,305,036 A * | 4/1994 | Tanaka | ............... | G02B 7/04 396/137 |
| 8,006,429 B2 * | 8/2011 | Windauer | ............... | F41G 3/06 42/122 |
| 8,516,736 B2 * | 8/2013 | Windauer | ............... | G05G 1/10 42/122 |
| 9,170,068 B2 * | 10/2015 | Crispin | ............... | F41G 1/38 |
| 9,665,120 B2 * | 5/2017 | Windauer | ............... | G05G 5/12 |
| 10,012,816 B2 * | 7/2018 | Leitner | ............... | G02B 7/02 |
| 10,578,399 B2 * | 3/2020 | Crispin | ............... | F41G 1/38 |
| 2019/0128642 A1 * | 5/2019 | Davis | ............... | F41G 1/38 |
| 2020/0271415 A1 * | 8/2020 | Crispin | ............... | F41G 1/38 |

FOREIGN PATENT DOCUMENTS

| | | |
|---|---|---|
| CZ | 306 968 B6 | 10/2017 |
| CZ | 32 239 U1 | 10/2018 |

OTHER PUBLICATIONS

European Search Report, dated Jan. 8, 2020, issued in corresponding European Patent Application No. 19 18 9303. Total 2 pages.

* cited by examiner

BINOCULAR FOCUSING MECHANISM WITH ADJUSTABLE STIFFNESS OF OPERATION

CROSS-REFERENCE TO A RELATED APPLICATION

The present application claims priority to Czech Republic Patent Application No. PV 2018-415, filed Aug. 14, 2018, the content of which is incorporated by reference herein.

TECHNICAL FIELD

The invention relates to a dual-stiffness focusing mechanism for a binocular which comprises a focusing knob which is mounted rotatably about its longitudinal axis on a static shaft which is mounted rigidly in the binocular construction, the focusing knob being associated with a braking means with a braking effect enabling dual stiffness of operation.

BACKGROUND ART

CZ 306 968 discloses a focusing mechanism for a binocular with a central focusing knob, in which the dial is on its front surface provided with radial grooves arranged as two circular segments. The focusing knob is associated with a braking body, which is mounted displaceably on the central shaft of the focusing knob in the direction of the longitudinal axis of the central shaft of the focusing knob. The central shaft of the focusing knob is rigidly connected to the binocular structure, i.e., it does not rotate about its longitudinal axis by itself. The axially movable braking body is provided with an annular groove in its front wall adjacent to the focusing knob. An annular carrier of the braking o-ring carrier is mounted rotatably in the annular groove about the longitudinal axis of the central shaft of the focusing knob. Between the circumferential cylindrical wall of the annular carrier and the opposite cylindrical wall of the annular groove in the braking body, the braking o-ring is seated, abutting the two cylindrical walls. The annular carrier is provided with radial grooves on its front wall which is adjacent to the face of the focusing knob, whereby these radial grooves correspond to the radial grooves on the face of the focusing knob. On the outer casing of the braking body there is a control grip which is rigidly connected to the braking body. For proper operation, the braking body is provided with a rotation locking pin. This solution provides the possibility that the user of the binocular can, according to his current needs, set either low stiffness of the focusing knob rotation, for example to observe dynamically moving objects, or set a higher stiffness of the focusing knob rotation, for example to observe static or slowly moving objects, this being done simply by moving the control grip in the direction of the longitudinal axis of the central shaft of the focusing knob. The focusing knob can be rotated in both extreme positions of the braking body, whereby in the position of the braking body moved to the focusing knob the focusing knob puts more resistance to its rotation, which is perceived by the user as increasing the stiffness of the focusing knob operation. The drawback of this arrangement, however, is the technological difficulty, which has a negative impact on the price, service life and efficiency of the series production of a binocular with such a solution of dual stiffness of focusing operation, which results mainly from the axially sliding arrangement of the braking body on the central shaft of the focusing knob. Another disadvantage of this solution is the fact that with an unsuitable ratio of holding forces between the focusing knob elements and the braking body and the circumferential forces during the rotation of the focusing knob, the focusing knob and the braking body may be disengaged, or the individual grooving teeth may be skipped, etc.

The object of the invention is to eliminate or at least reduce the disadvantages of the background art.

PRINCIPLE OF THE INVENTION

The object of the invention is achieved by a dual-stiffness focusing mechanism for a binocular, whose principle consists in that the focusing knob is provided with a braking drum, whereby the cylindrical circumferential surface of the braking drum is associated rotatably about the longitudinal axis with a braking ring by the cylindrical circumferential surface thereof, whereby another cylindrical circumferential surface of the braking ring is associated by its circumferential surface with a collet of a clamping ring, the clamping ring being fixed with its rigid part in a housing which is rigidly mounted on a static shaft, whereby the collet of the clamping ring is associated with the control of the pressure force on the cylindrical circumferential area of the braking ring, the control of the pressure force of the collet being coupled to a switch of stiffness of the focusing operation.

The advantage of this solution is its easy production, durability and high reliability.

EXAMPLES OF EMBODIMENT

Figure 1:
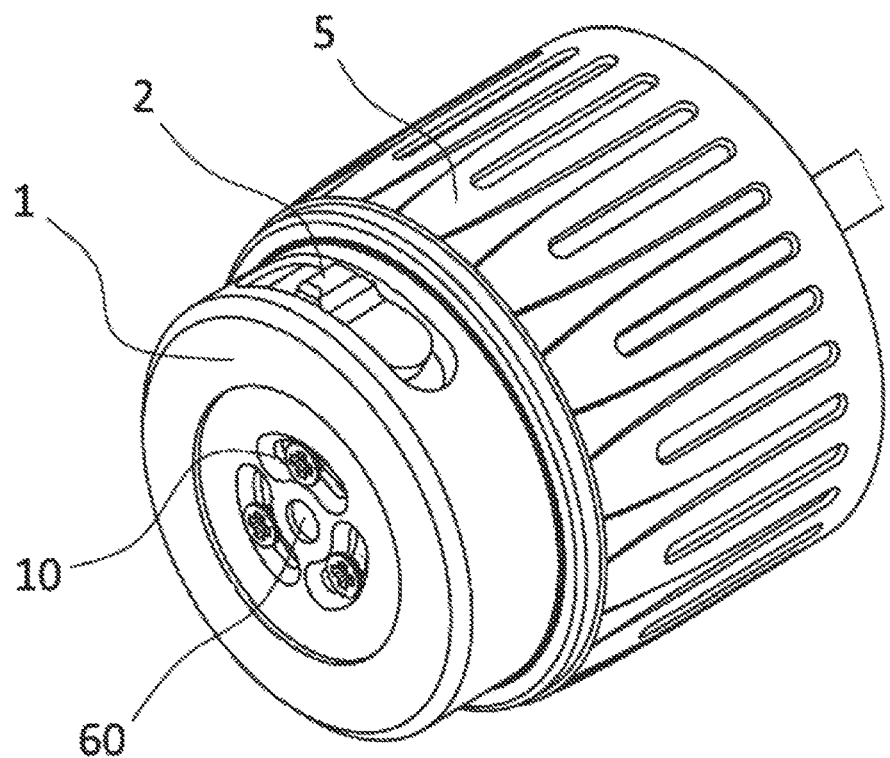
FIG. 1 is an overall external view of a focusing mechanism for a binocular.
Figure 2:
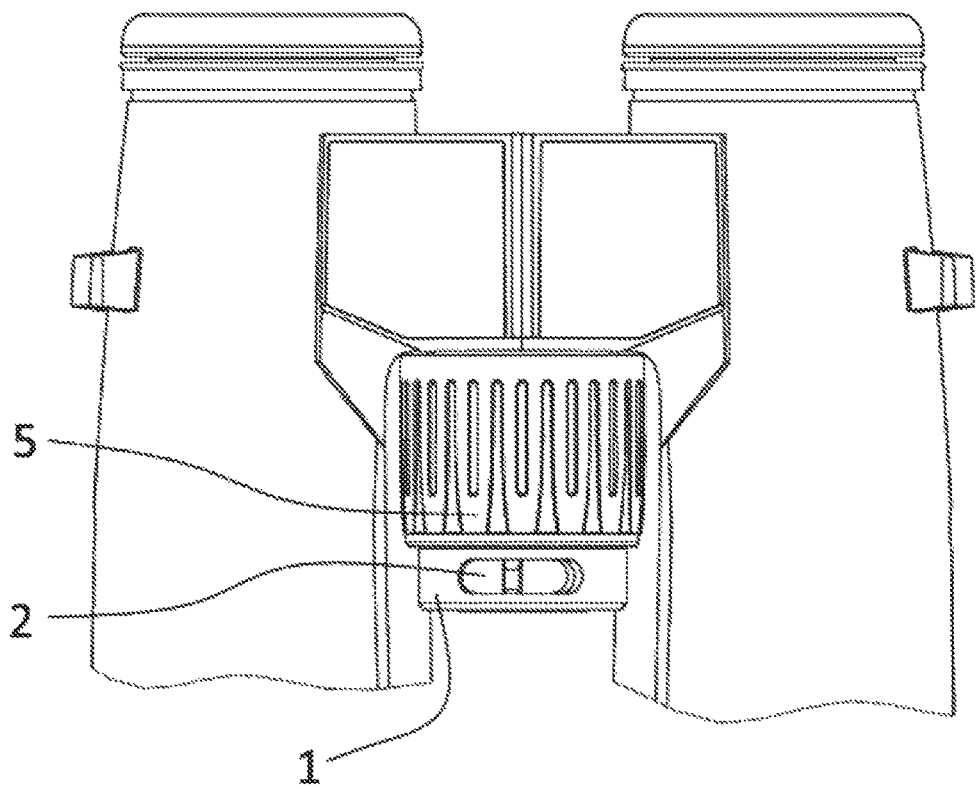
FIG. 2 is an external view of the focusing mechanism integrated in the binocular assembly.
Figure 3:
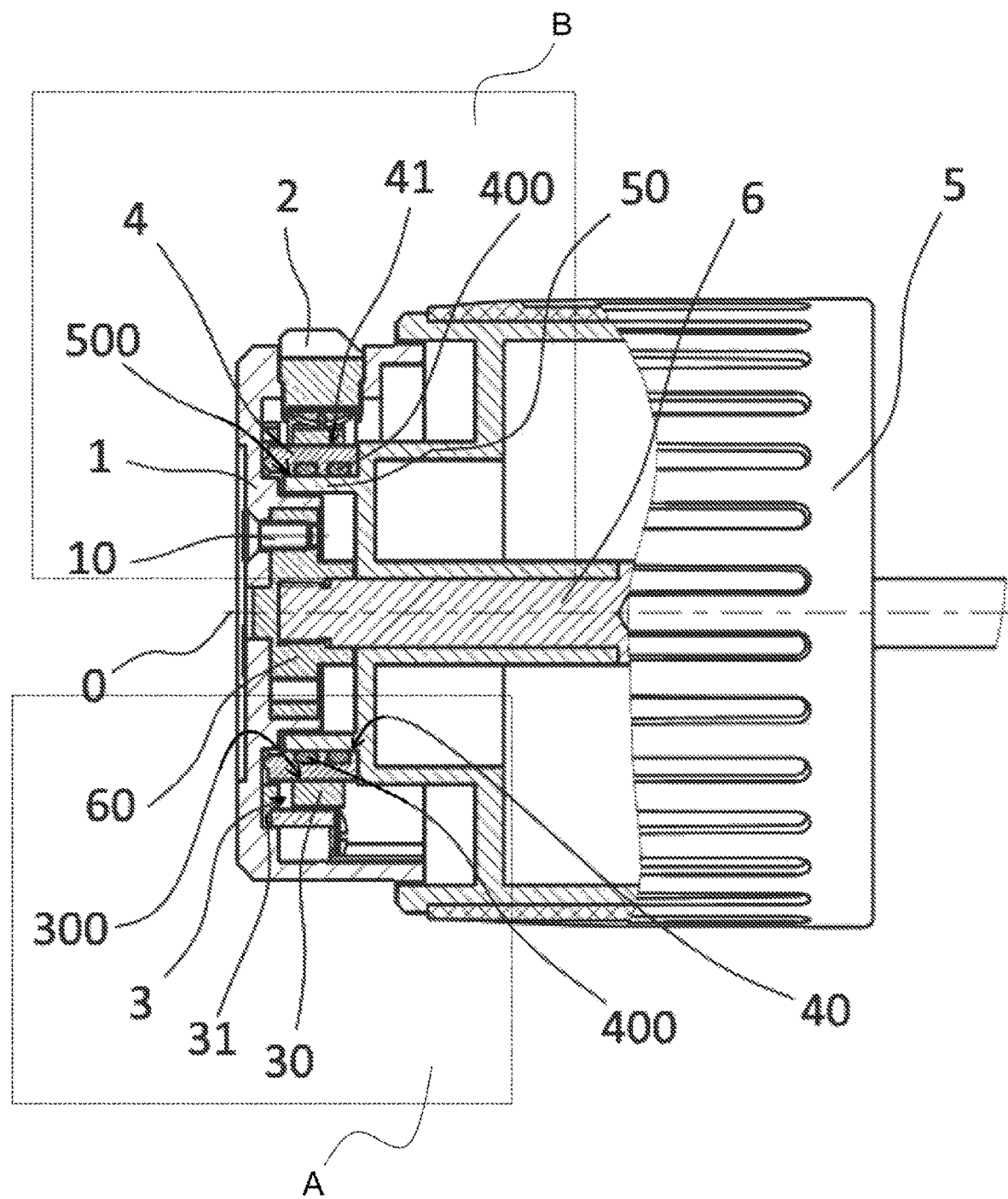
FIG. 3 is a longitudinal section through the focusing mechanism of the binocular according to the present invention.
Figure 4A:
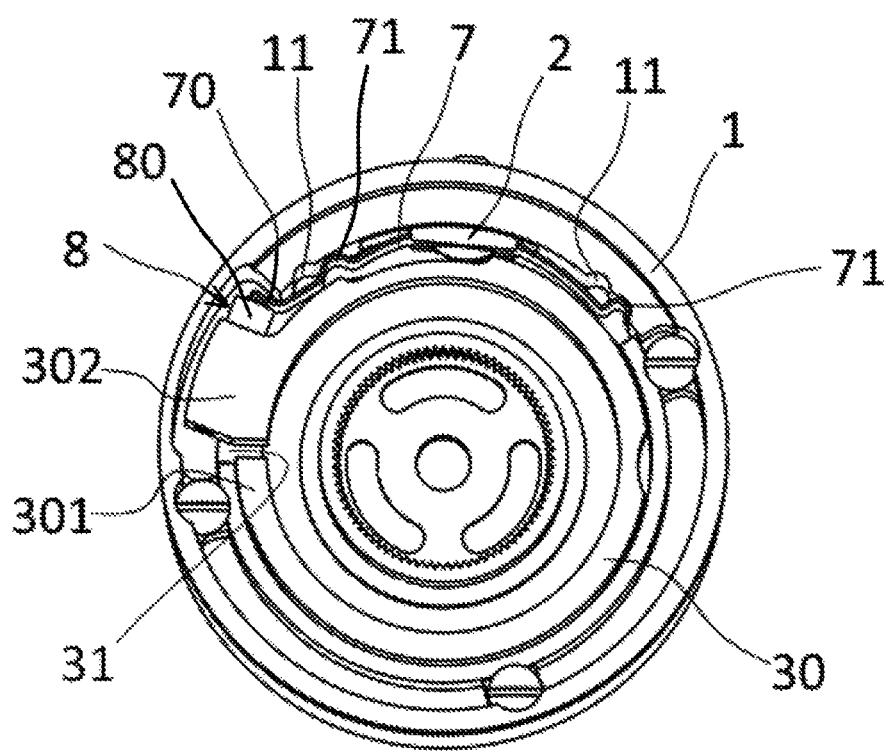
FIG. 4A shows a housing with a built-in clamping ring.
Figure 4B:
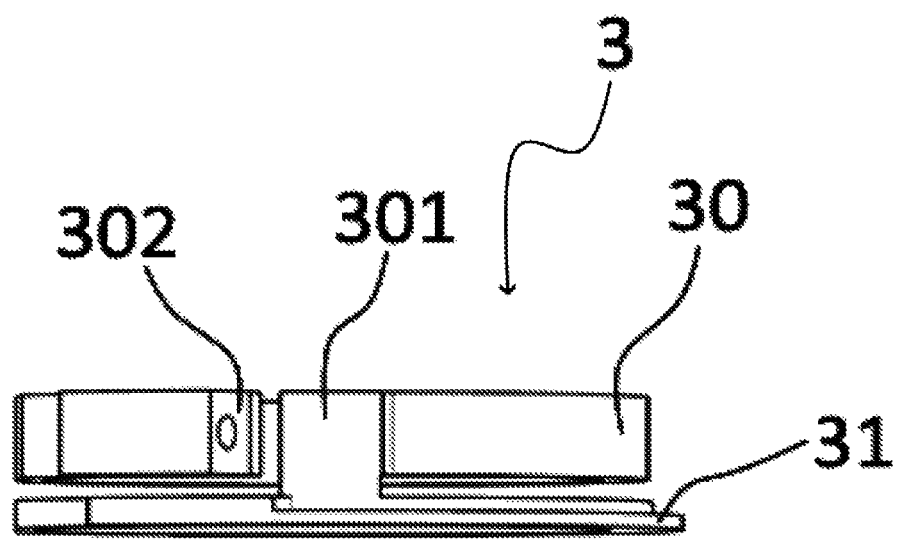
FIG. 4B is a side view of the clamping ring.

The invention will be described with reference to an exemplary embodiment of a focusing mechanism for a binocular with adjustable stiffness of operation.

The focusing mechanism comprises a focusing knob 5 which is mounted rotatably about its longitudinal axis O on a static shaft 6 which is fixedly mounted in the structure of the binocular. The focusing knob 5 is provided on its rear side with a braking drum 50.

On the outer cylindrical circumferential surface 500 of the braking drum 50 is rotatably mounted a braking ring 4 with its inner cylindrical circumferential surface 40. Between the outer cylindrical circumferential surface 500 of the braking drum 50 and the inner cylindrical circumferential surface 40 of the braking ring 4 is arranged at least one braking o-ring 400, which is made of a suitable material, e.g. of rubber.

The outer cylindrical circumferential surface 41 of the braking ring 4 is with the inner circumferential surface 300 associated with a collet 30 of a clamping ring 3. The clamping ring 3 is fixed in a housing 1 which is fixedly mounted on the static shaft 6, e.g. the housing 1 is by means of screws 10 attached to a flange 60 which is mounted at the end of the static shaft 6.

The collet 30 of the clamping ring 3 is formed by a transversely interrupted deformable cylindrical body, which is in the area of its first end 301 attached to the rigid part 31 of the clamping ring 3 and which is in the area of its other free end 302 coupled to the control of the gripping of the collet 30.

In the exemplary embodiment shown, the control of the gripping of the collet 30 of the clamping ring 3 comprises a tangential pin 8 which is mounted resiliently reversibly displaceably in the tangential direction in the free end 302 of the collet 30. The free end 80 of the tangential pin 8 is associated with a push end 70 of the control lever 7, which is mounted on a switch 2 of the focusing stiffness, which is tangentially reversibly mounted in the housing 1. In the exemplary embodiment shown, the control lever 7 is formed as a flat spring with positioning projections 71 which fit into the grooves 11 in the housing 1 for easier locking of the individual positions of the switch 2 of the focusing stiffness. In the exemplary embodiment shown, it is an embodiment designed for the two extreme positions of the switch 2 of the stiffness of focusing operation and hence the design with dual focusing stiffness.

In the illustrated example of embodiment, a recess is formed for the tangential pin 8 in the free end 302 of the collet 30 in the tangential direction. In the recess, a compression spring 9 of the spring loading of the tangential pin 8, is mounted on a shank of the pin 8. In an unillustrated exemplary embodiment, the tangential pin 8 is hollow and the compression spring 9 extends into the cavity of the tangential pin 8.

Figure 5:
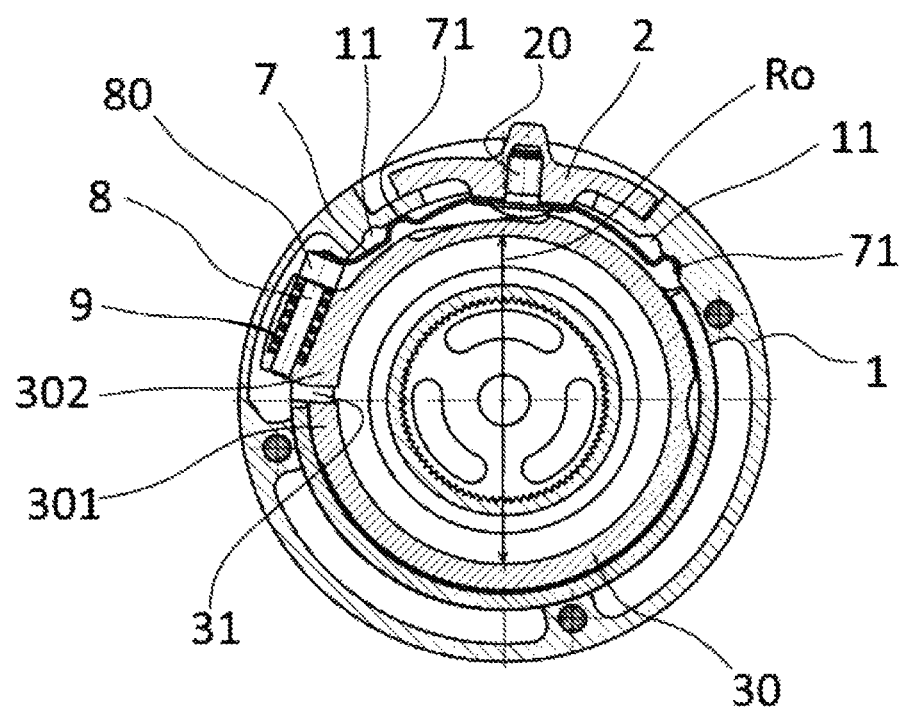
FIG. 5 is a front view of the housing with the built-in clamping ring in the position of the lowest focusing stiffness.

The focusing mechanism of the binocular with adjustable stiffness of operation operates in such a manner that with the lowest stiffness of focusing, the switch 2 of the stiffness of focusing operation is in the position of FIG. 5 when the tangential pin 8 is extended as far as possible from the free end 302 of the collet 30 which does not exert any pressure force onto the outer cylindrical circumferential surface 41 of the braking ring 4. Thus, the focusing knob 5 and the braking ring assembly rotates without generating additional frictional torque and the resulting stiffness of the focusing operation, or the rotation of the focusing knob 5, is determined by the sum of the natural frictional moments of the complete focusing mechanism of the binocular. In principle, the inner diameter of the collet 30 now has a basic value R0.

Figure 6:
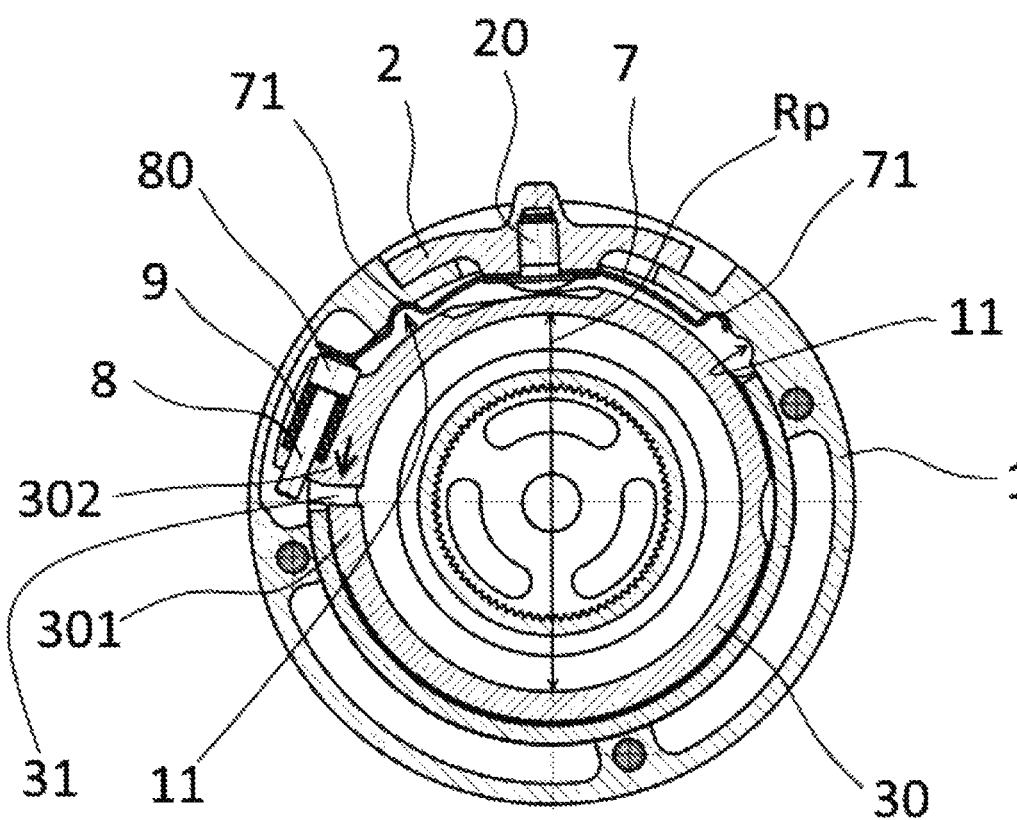
FIG. 6 is a front view of the housing with the built-in clamping ring in the position of the highest focusing stiffness.
Figure 7:
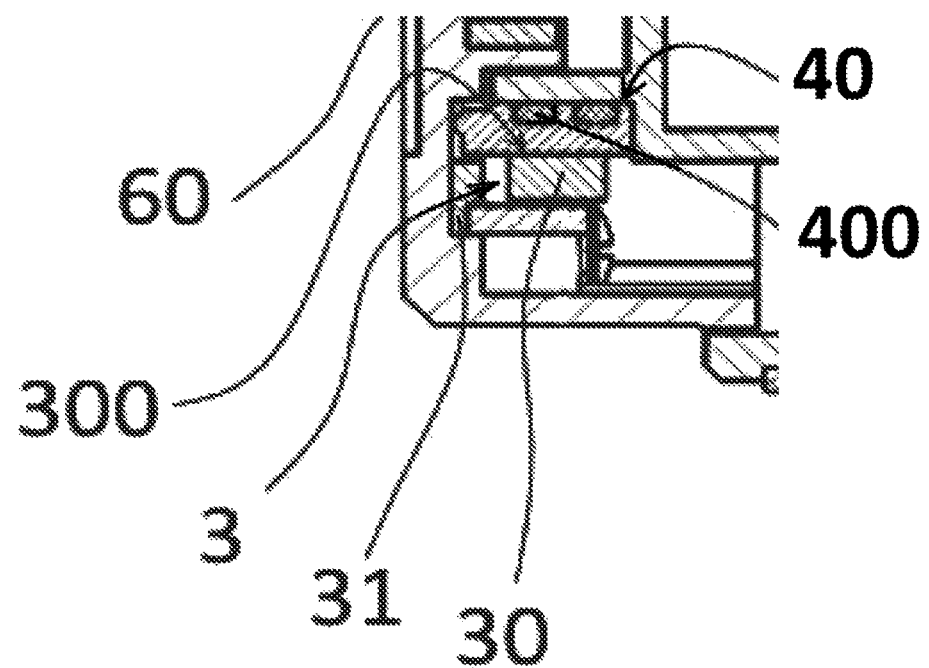
FIG. 7 is an enlargement of section A in FIG. 3.
Figure 8:
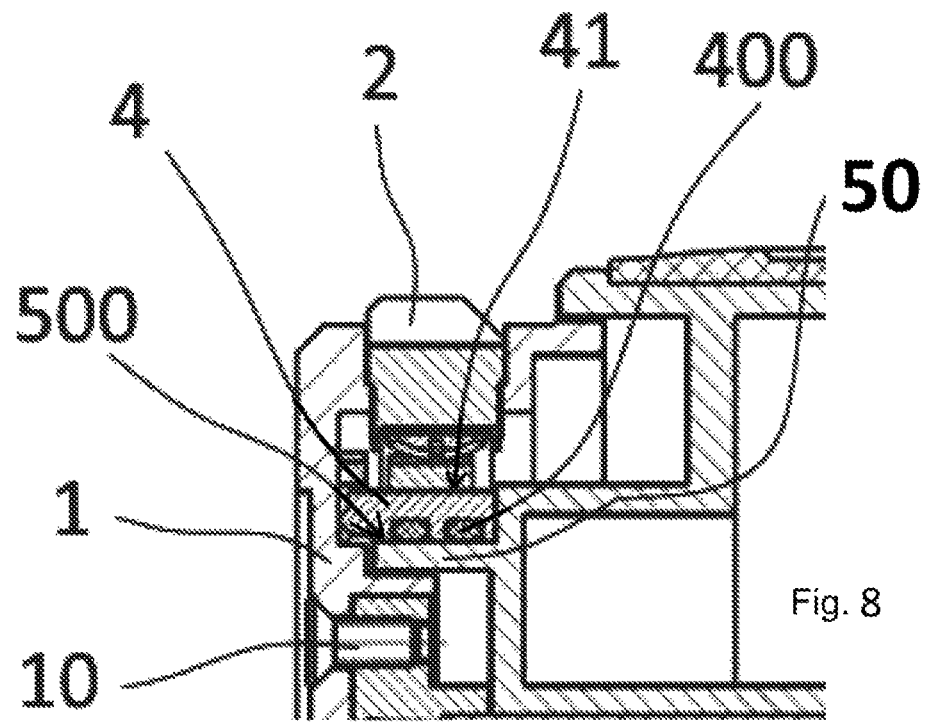
FIG. 8 is an enlargement of section B in FIG. 3.

If the user moves the switch 2 of stiffness of the focusing operation so that the push end 70 of the control lever 7 pushes the tangential pin 8 into the free end 302 of the collet 30, in the illustrated example of embodiment, e.g., into the position of FIG. 6, this results in a tangential pressure force which causes the collet 30 to deform, the collet having a substantially internal diameter R1<R0 and which in this manner increases its pressure force on the outer cylindrical circumferential surface 41 of the braking ring 4, thereby blocking its rotational movement. When turning the focusing knob 5, an additional frictional moment arises between the locked braking ring 4 and the focusing knob 5 on the outer cylindrical circumferential surface 500 of the braking drum 50, thereby increasing the resulting stiffness of the focusing operation, or of the rotation of the focusing knob 5.

Apparently, the above-described system may be also arranged such that the inner cylindrical surfaces described are formed as outer cylindrical surfaces which are associated with the cylindrical surfaces which have been described above as outer cylindrical surfaces, or various combinations of the inner and outer cylindrical surfaces are possible, including the arrangement of the collet 30 which is arranged and controlled as an expanding element in the inner cylindrical surface, etc.

INDUSTRIAL APPLICABILITY

The invention is applicable especially in the production of binoculars.

The invention claimed is:

1. A focusing mechanism for a binocular structure with dual stiffness of focusing operation, comprising: a focusing knob rotatably mounted on a static shaft to rotate about a longitudinal axis, the static shaft being fixedly mounted in the binocular structure, a braking means integrated with the focusing knob, the braking means having an adjustable braking capability, the braking means including a braking drum having a cylindrical circumferential surface that is rotatable about the longitudinal axis, a braking ring having a cylindrical circumferential surface configured to contact the cylindrical circumferential surface of the braking drum, and a clamping ring having a collet, the collet of the clamping ring having a rigid part seated in a housing and configured to contact the braking ring, wherein the collet of the clamping ring includes a control means of applying pressure to the cylindrical circumferential surface of the braking ring, the control means comprising a displaceable body and a switch for positioning the control means to adjust the stiffness of the focusing operation.

2. The focusing mechanism for a binocular structure with dual stiffness of focusing operation according to claim 1, wherein the braking drum is provided with an outer cylindrical circumferential surface, wherein the braking ring is provided with an inner cylindrical circumferential surface, wherein the inner circumferential surface of the braking ring is mounted on the outer cylindrical circumferential surface of the braking drum to rotate about the longitudinal axis, wherein the braking ring is provided with an outer cylindrical circumferential surface, wherein the collet is provided with an inner circumferential surface, and wherein the outer cylindrical circumferential surface of the braking ring is associated with the inner circumferential surface of the collet.

3. The focusing mechanism for a binocular structure with dual stiffness of focusing operation according to claim 2, wherein at least one braking o-ring is arranged between the outer cylindrical circumferential surface of the braking drum and the inner cylindrical circumferential surface of the braking ring.

4. The focusing mechanism for a binocular structure with dual stiffness of focusing operation according to claim 1, wherein the collet of the clamping ring is formed by a transversely interrupted deformable cylindrical body having a first end and a second end, wherein the first end is attached to the rigid part of the clamping ring and the second end is free and is coupled to the control means of applying pressure.

5. The focusing mechanism for a binocular structure with dual stiffness of focusing operation according to claim 4, wherein the control means of applying pressure comprises a tangential pin which is mounted to be resiliently, reversibly, and tangentially displaceable in the tangential direction in the second end of the transversely interrupted deformable cylindrical body, wherein the tangential pin is provided with a free end which is associated with a push end of a control lever, wherein the control lever is mounted on the switch for positining the control means to adjust the stiffness of the focusing operation, and wherein the switch is tangentially, reversibly, and displaceably mounted in the housing.

6. The focusing mechanism for a binocular structure with dual stiffness of focusing operation according to claim 5, wherein the control lever is formed by a flat spring, which is provided with positioning projections, and wherein the housing is provided with grooves and the positioning projections cooperate with the grooves in individual positions of the switch.

7. The focusing mechanism for a binocular structure with dual stiffness of focusing operation according to claim 5, wherein the tangential pin is resiliently mounted in the second free end of the collet by a compression spring.

8. The focusing mechanism for a binocular strucutre with dual stiffness of focusing operation according to claim 7, wherein the tangential pin is hollow and is provided with a cavity, and wherein the compression spring extends into the cavity of the tangential pin.

9. The focusing mechanism for a binocular structure with dual stiffness of focusing operation according to claim 7, wherein the tangential pin is provided with a shank on which the compression spring is mounted.

\* \* \* \* \*